United States Patent
Yue et al.

(10) Patent No.: US 8,064,036 B2
(45) Date of Patent: Nov. 22, 2011

(54) LIQUID CRYSTAL OPTICAL SWITCH CONFIGURED TO REDUCE POLARIZATION DEPENDENT LOSS

(75) Inventors: Xuefeng Yue, San Jose, CA (US); Christopher Lin, El Cerrito, CA (US); Ruipeng Sun, Pleasanton, CA (US); Ruibo Wang, Oak Park, CA (US)

(73) Assignee: Oclaro (North America), Inc., San Jose, CA (US)

( * ) Notice: Subject to any disclaimer, the term of this patent is extended or adjusted under 35 U.S.C. 154(b) by 365 days.

(21) Appl. No.: 12/433,769

(22) Filed: Apr. 30, 2009

(65) Prior Publication Data

US 2010/0277658 A1    Nov. 4, 2010

(51) Int. Cl.
  G02B 6/35  (2006.01)
  G02F 1/13  (2006.01)

(52) U.S. Cl. ............ 349/196; 349/193; 385/16; 385/18; 385/22; 385/140

(58) Field of Classification Search .................. None
See application file for complete search history.

(56) References Cited

U.S. PATENT DOCUMENTS

| | | | |
|---|---|---|---|
| 4,461,543 A * | 7/1984 | McMahon | 359/320 |
| 5,724,165 A * | 3/1998 | Wu | 398/55 |
| 5,946,116 A * | 8/1999 | Wu et al. | 398/55 |
| 5,963,291 A * | 10/1999 | Wu et al. | 349/196 |
| 6,327,019 B1 * | 12/2001 | Patel et al. | 349/196 |
| 6,337,934 B1 | 1/2002 | Wu et al. | |
| 6,735,016 B1 * | 5/2004 | Mao et al. | 359/484.05 |
| 6,807,329 B2 * | 10/2004 | Zalevsky et al. | 385/16 |
| 7,113,279 B2 | 9/2006 | Liu et al. | |
| 7,263,250 B1 * | 8/2007 | Wang et al. | 385/16 |
| 2002/0171905 A1 * | 11/2002 | Liu et al. | 359/256 |
| 2003/0095305 A1 | 5/2003 | Kewitsch et al. | |
| 2005/0232570 A1 * | 10/2005 | Ide | 385/140 |
| 2006/0039648 A1 * | 2/2006 | Barbarossa et al. | 385/24 |
| 2008/0218680 A1 * | 9/2008 | Yuan et al. | 349/196 |
| 2008/0219668 A1 | 9/2008 | Barbarossa | |
| 2008/0260390 A1 | 10/2008 | Barbarossa | |
| 2010/0214527 A1 * | 8/2010 | Yue et al. | 349/196 |

FOREIGN PATENT DOCUMENTS

JP    3-204621 A  *  9/1991

OTHER PUBLICATIONS

International Search Report and Written Opinion dated Jul. 6, 2010, International Application No. PCT/US2010/033207.

* cited by examiner

*Primary Examiner* — Mike Stahl
(74) *Attorney, Agent, or Firm* — Patterson & Sheridan, L.L.P.

(57) ABSTRACT

An optical device has the structure to perform switching and attenuation of an optical beam with reduced polarization dependent loss (PDL). The optical device includes a birefringent displacer and two liquid crystal (LC) structures. The first LC structure is used to condition s-polarized components of the optical beam and the second LC structure is used to condition p-polarized components of the optical beam. Each LC structure has a separate control electrode so that the s-polarized components of the optical beam and the p-polarized components of the optical beam can be conditioned differently and in such a manner that reduces PDL. The optical device may be configured for processing multiple input light beams, such as the multiple wavelength channels de-multiplexed from a wavelength division multiplexed (WDM) optical signal.

20 Claims, 9 Drawing Sheets

LIQUID CRYSTAL OPTICAL SWITCH CONFIGURED TO REDUCE POLARIZATION DEPENDENT LOSS

BACKGROUND OF THE INVENTION

1. Field of the Invention

Embodiments of the present invention relate generally to optical communication systems and components and, more particularly, to a liquid crystal-based optical switch and attenuator.

2. Description of the Related Art

In optical communication systems, it is sometimes necessary to perform 1×2 switching of an optical signal, where an input light beam enters an optical switching device through an input port and is directed to one of two output ports. There are also more complicated optical switching schemes, such as 2×2, 1×N, and N×N optical switches, which may be realized by combining multiple 1×2 optical switches.

In addition to routing of signals by optical switches, attenuation of signals in optical communication systems is needed, for example in an optical communication system that employs wavelength division multiplexing (WDM). In such an optical system, information is carried by multiple channels, each channel having a unique wavelength. WDM allows transmission of data from different sources over the same fiber optic link simultaneously, since each data source is assigned a dedicated channel. The result is an optical communication link with an aggregate bandwidth that increases with the number of wavelengths, or channels, incorporated into the WDM signal. In this way, WDM technology maximizes the use of an available fiber optic infrastructure, such that what would normally require multiple optic links or fibers instead requires only one. In practice, different wavelength channels of a WDM signal typically undergo asymmetrical losses as they travel through an optical communication system, resulting in unequal intensities for each channel. Because these unequal intensities can compromise the integrity of the information carried by the WDM signal, an optical device or array of optical devices is used in WDM systems to perform wavelength-independent attenuation to equalize the respective intensities of the channels contained in a WDM signal.

Liquid crystal (LC) based optical switches are known in the art for switching and attenuation of the channels contained in a WDM signal, and in some applications offer significant advantages over other optical switch designs, but there is one drawback related to the polarization state of an input light beam. Because LC-based optical switches rely on rotating the polarization state of linearly polarized input light to perform switching functions, the input light beam must have a single known polarization state for such an optical switch to vary the optical path of the light beam as desired. However, optical signals transmitted over optical fibers are usually randomly polarized, i.e., the optical signals have a random superposition of the s- and p-components, and each polarization component must be treated separately by an optical switch.

One approach known in the art for managing s- and p-polarized components of a light beam for LC switching of the light beam involves performing a polarization "walk-off" with a birefringent optical element to spatially divide the light beam into s- and p-polarized light beams or components. Polarization walk-off can be performed when an optical signal is first introduced into an LC-based optical switch, for example, as the optical signal exits an optical input fiber and becomes a free-space beam. After a birefringent optical element separates the optical signal into two physically displaced s- and p-polarized components, the polarization of one of the components can be rotated 90° to match the polarization of the other. In this way, the optical signal is converted into a pair of closely spaced, parallel beams having the same polarization state, and this pair of beams can be treated together by the optical switch as a single light beam having a known polarization state. However, such an approach requires the optical signal to be in the form of two parallel beams, sometimes over a long path length, which increases the likelihood of large polarization dependent losses (PDL) that degrade signal quality. In addition, because a relatively large optical assembly is needed to perform the polarization walk-off as the optical signal exits the fiber, an undesirably large spacing between the input and output ports of the optical switch, e.g., greater than 1 mm, results.

Alternatively, an LC-based optical switch can divide an input beam into s- and p-polarized components, then manage the attenuation and switching of each component separately. Such an approach can result in significant PDL, however, due to the different attenuation performance of an LC material toward s- and p-polarized light. FIG. 1 illustrates the electro-optic behavior of an LC optical attenuator with respect to incident s- and p-polarized light and includes attenuation curves 191 and 192. The abscissa of graph 100 represents voltage applied to the LC optical attenuator and the ordinate of graph 100 represents resultant attenuation of a light beam normally incident on and passing through the optical attenuator. Attenuation curve 191 illustrates the attenuation of the light beam that is s-polarized and attenuation curve 192 illustrates the attenuation of the light beam that is p-polarized. As shown, the attenuation curve of p-polarized light differs substantially from the attenuation of s-polarized light. Thus, when the s- and p-polarized components of a light beam are both conditioned by the LC optical attenuator, each component is attenuated by a different amount, resulting in PDL 193. For example, at applied voltage $V_o$, the LC optical attenuator attenuates s-polarized light 10 dB and p-polarized light 12 dB, producing a PDL 193 of 2 dB.

While switching and attenuation of optical signals are known in the art, each of these operations is typically performed by a different optical device. The use of one optical device to perform switching and another device to perform attenuation in an optical communication system increases the size and complexity of the system, makes erosion of signal quality more likely due to misalignment of the optical devices, and requires a first independent control signal to complete the switching function and a second independent control signal to complete the attenuation function.

Accordingly, there is a need in the art for an optical switch for use in an optical network that has a minimal number of components and closely spaced input and output ports and can perform switching and low-PDL attenuation of an optical signal having an arbitrary combination of s-polarized and p-polarized light.

SUMMARY OF THE INVENTION

One or more embodiments of the present invention provide an optical device having the structure to perform switching and attenuation of an optical beam with reduced PDL. The optical device includes a birefringent displacer and two liquid LC structures. The first LC structure is used to condition s-polarized components of the optical beam and the second LC structure is used to condition p-polarized components of the optical beam. Each LC structure has a separate control electrode so that the s-polarized components of the optical beam and the p-polarized components of the optical beam can be conditioned differently and in such a manner that reduces PDL. The optical device may also be configured as a wavelength selective switch for processing multiple input light beams, such as the multiple wavelength channels de-multiplexed from a wavelength division multiplexed optical signal.

An optical device according to one embodiment of the present invention includes a birefringent displacer disposed in an optical path of an input beam and optical paths of multiple output beams that are produced from components of the input beam, a first LC structure for conditioning the polarization state of incident light and disposed in optical paths of p-polarized components of the input beam and the output beams, the first LC structure having a plurality of LC cells and a first control electrode that applies the same control signal to the LC cells of the first LC structure, and a second LC structure for conditioning the polarization state of incident light and disposed in optical paths of s-polarized components of the input beam and the output beams, the second LC structure having a plurality of LC cells and a second control electrode that applies the same control signal to the LC cells of the second LC structure. The first LC structure and the second LC structure are independently controllable using the first control electrode and the second control electrode, respectively.

An optical device according to another embodiment of the present invention is configured to reduce polarization dependent losses by independently controlling p-polarized light components and s-polarized light components. The optical device includes a first LC structure for conditioning the polarization state of incident light and disposed in optical paths of p-polarized components of an input beam and output beams produced from the input beam, the first LC structure having a plurality of LC cells and a first control electrode that applies the same control signal to the LC cells of the first LC structure, and a second LC structure for conditioning the polarization state of incident light and disposed in optical paths of s-polarized components of the input beam and the output beams, the second LC structure having a plurality of LC cells and a second control electrode that applies the same control signal to the LC cells of the second LC structure. The control signal applied by the first control electrode is different from the control signal applied by the second control electrode.

A wavelength selective switch according to an embodiment of the present invention includes a wavelength dispersive element for separating an input beam into its wavelength components, a first LC structure for conditioning the polarization state of incident light and disposed in optical paths of p-polarized components of the wavelength components and output beams produced from the wavelength components, the first LC structure having a plurality of LC cells and a first control electrode that applies the same control signal to the LC cells of the first LC structure, and a second LC structure for conditioning the polarization state of incident light and disposed in optical paths of s-polarized components of the wavelength components and the output beams, the second LC structure having a plurality of LC cells and a second control electrode that applies the same control signal to the LC cells of the second LC structure. The first LC structure and the second LC structure are independently controllable using the first control electrode and the second control electrode, respectively.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention contemplate an optical switching device that performs both 1×2 switching and attenuation of an optical beam with reduced polarization dependent loss (PDL), where the optical beam has an arbitrary combination of s- and p-polarized light. The optical switching device separates the optical beam into s- and p-polarized components and uses a first liquid crystal (LC) beam-polarizing structure and a first control signal for switching and attenuation of the s-component, and a second LC beam-polarizing structure and a second control signal for switching and attenuation of the p-component, so that each polarization component is attenuated by substantially the same amount.

The optical device includes a birefringent displacer, two liquid crystal (LC) beam-polarizing structures having three subpixels each, and a polarization separating and rotating assembly. The birefringent displacer separates input light beams into s- and p-polarized components before the components are conditioned by the LC beam-polarizing structures and combines the separate s- and p-polarized components of output light beams into a single output beam after the components have been conditioned by the LC beam-polarizing structures. The pixels in the first LC beam-polarizing structure condition the components of input and output beams having one polarization, e.g. s-polarized light, while the pixels in the second LC beam-polarizing structure condition the components of input and output beams having another polarization, e.g. p-polarized light. Each LC beam-polarizing structure allows for 1×2 switching and attenuation control of one polarization component using a single control signal. By expanding the LC beam-polarizing structures into an array of such structures, the optical switching device may be configured for processing multiple input light beams, such as the multiple wavelength channels de-multiplexed from a wavelength division multiplexed (WDM) optical signal.

Figure 2A:
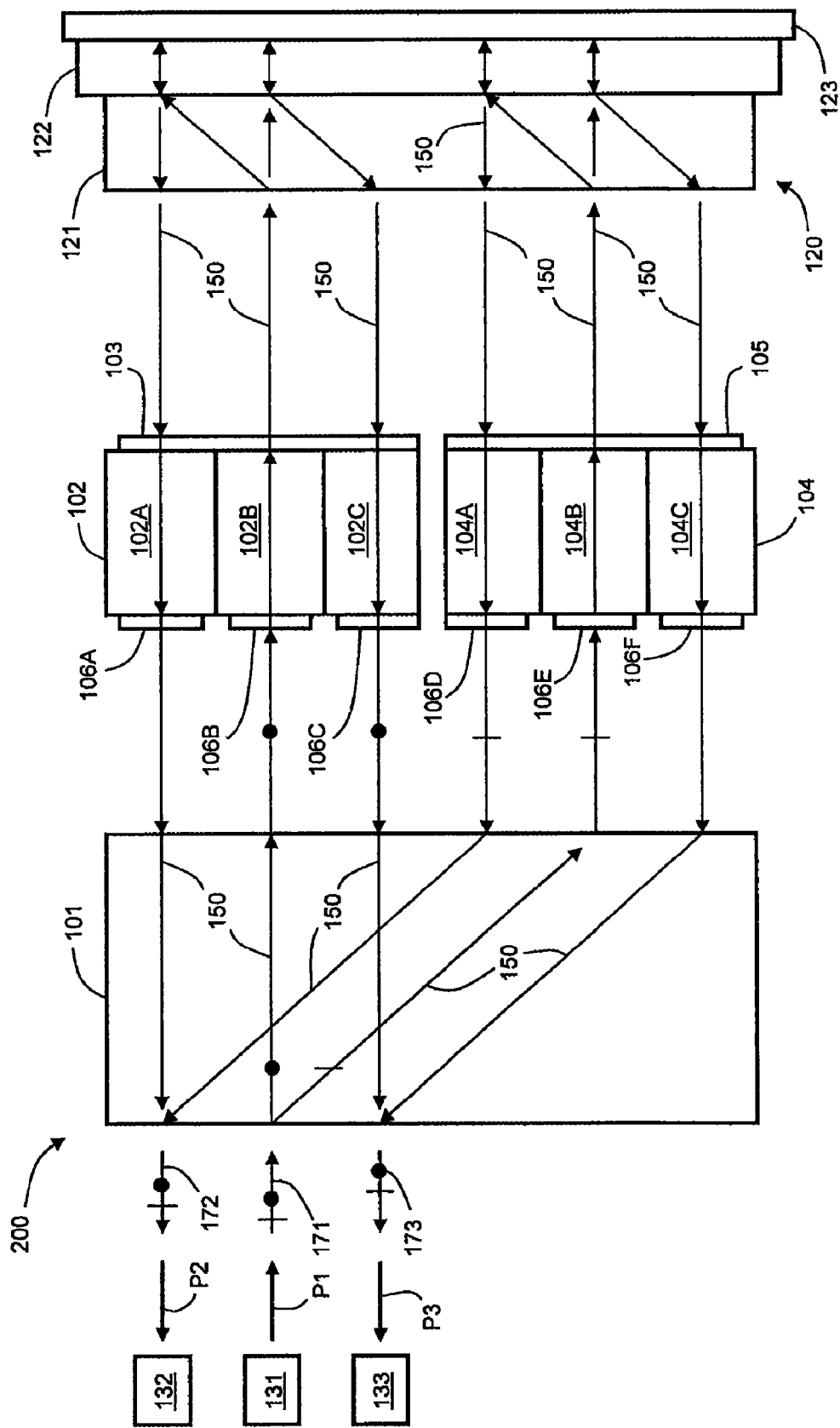
FIG. 2A schematically illustrates a cross-sectional view of an optical device that is configured to provide 1×2 switching and attenuation of an optical signal with minimal PDL, according to an embodiment of the invention.

FIG. 2A schematically illustrates a cross-sectional view of an optical device 200 that is configured to provide 1×2 switching and attenuation of an optical signal with minimal PDL, according to an embodiment of the invention. Optical device 200 includes a birefringent displacer 101, LC beam-polarizing structures 102, 104, and a polarization separating and rotating assembly 120, all of which are optically coupled as shown for the treatment, i.e., the switching and attenuation, of an input beam 171. To act as a 1×2 optical switch, optical device 200 is optically coupled to an input port 131 and output ports 132, 133 by optical paths P1, P2, and P3, respectively. The possible optical paths 150 of input beam 171, output beams 172, 173, and their respective s- and p-polarized components in optical device 200 are depicted as arrows. P-polarized light is denoted by arrows with a vertical bar, and s-polarized light by arrows with a dot. The specific optical paths 150 traveled by input and output beams in particular switching configurations of optical device 200, e.g., switching an input beam from input port 131 to output port 132, are described below in conjunction with FIGS. 2B, 2C.

Birefringent displacer 101 may be a YVO$_4$ crystal or other birefringent material that translationally deflects incident light beams by different amounts based on orthogonal polarization states. Birefringent displacer 101 is oriented relative to input beam 171 so that light of one polarization state (s-polarization, in the embodiment illustrated in FIGS. 2A-C) passes through birefringent displacer 101 without significant deflection and light of the opposite polarization state (p-polarization, in the embodiment illustrated in FIGS. 2A-C) passes through birefringent displacer 101 with the deflection shown. Consequently, the s-polarized component of input beam 171 is directed to LC beam-polarization structure 102 for polarization conditioning, and the p-polarized component of input beam 171 is directed to LC beam-polarization structure 104 for polarization conditioning. The polarization conditioning as performed by LC beam-polarization structures 102, 104 is described below.

LC beam-polarizing structures 102 and 104 each include three LC subpixels formed between two transparent plates (not shown for clarity), which are laminated together to form LC subpixels 102A-C and LC subpixels 104A-C using techniques commonly known in the art. In one embodiment, LC beam-polarizing structures 102 and 104 are fabricated as a single LC structure, thereby simplifying the manufacture, assembly, and optical alignment of the components of optical device 200. LC subpixels 102A-C and 104A-C contain an LC material, such as twisted nematic (TN) mode material, electrically controlled birefringence (ECB) mode material, etc. LC beam-polarizing structure 102 also includes transparent electrodes that apply a potential difference across each of LC subpixels 102A-F, thereby selectively turning LC subpixels 102A-F "off" or "on," i.e., setting each LC subpixel to either modulate or not modulate the polarity of incident light. For a twisted nematic mode material, a potential difference of approximately zero volts produces a 90° rotation of polarity and a potential difference of about 5 or more volts produces a 0° rotation of polarity.

The transparent electrodes of LC beam-polarizing structure 102 include a single vertical control electrode 103 and three horizontal electrodes 106A-C, and may be patterned from indium-tin oxide (ITO) layers. Similarly, the transparent electrodes of LC beam-polarizing structure 104 include a single vertical control electrode 105 and three horizontal electrodes 106D-F. The transparent electrodes are covered with a buffered polyimide layer that determines LC configuration. Horizontal electrodes 106A-F are formed on a surface of one transparent plate and are positioned adjacent LC subpixels 102A-C and 104A-C, respectively, as shown. Vertical control electrode 103 is formed on a surface of the opposing transparent plate and is positioned adjacent to LC subpixels 102A-C, and vertical control electrode 105 is formed on a surface of the opposing transparent plate and is positioned adjacent to LC subpixels 104A-C. By conditioning the polarization state of incident light, LC subpixels 102A-C and 104A-C enable optical device 200 to perform both 1×2 switching and attenuation of input beam 171 having an arbitrary combination of s- and p-polarized light with a minimum PDL, as described below in conjunction with FIGS. 2B, 2C. References to the horizontal and vertical directions are for purposes of description only. One of skill in the art will recognize that optical device 200 may be configured in any orientation and perform 1×2 switching and attenuation as described herein.

Polarization separating and rotating assembly 120 includes a birefringent element 121, a quarter-wave plate 122, and a mirror 123. Birefringent element 121 may be substantially similar to birefringent displacer 101, except oriented with an optical axis so that an opposite deflection scheme is realized for incident light relative to the deflection scheme of birefringent displacer 101. Namely, for the embodiment illustrated in FIGS. 2A-C, incident p-polarized passes through birefringent displacer 121 with the deflection shown and s-polarized light passes through birefringent displacer 121 without significant deflection. Quarter-wave plate 122 is mounted on mirror 123, where mirror 123 reflects incident light as shown, and quarter-wave plate 122 rotates the polarization of incident light a total of 90° when incident light passes through quarter-wave plate 122 twice. Alternatively, in lieu of mirror 123, other optical apparatus can be devised by one of skill in the art to redirect light that has passed through LC beam-polarizing structure 102 and quarter-wave plate 122 back toward LC beam-polarizing structure 102 and quarter-wave plate 122 for a second pass.

In operation, optical device 200 performs 1×2 switching and low-PDL attenuation on a linearly polarized input beam, where the input beam has an arbitrary combination of s-polarized and p-polarized components. As part of the 1×2 switching operation, optical device 200 can be configured to direct input beam 171 from input port 131 to output port 132 (as output beam 172), or to output port 133 (as output beam 173). 1×2 switching and attenuation of input beam 171 between output ports 132 and 133 is accomplished by separating input beam 171 into s- and p-polarized components and conditioning the polarization of the s-component to a desired polarization using LC beam-polarizing structure 102 and conditioning the polarization of the p-component to a desired polarization using LC beam-polarizing structure 104. To minimize PDL when input beam 171 is attenuated by optical device 200, the s-component of beam 171 and the p-component of beam 171 may be conditioned differently (i.e., rotated by different amounts). After polarization conditioning, 1×2 switching and attenuation of input beam 171 is completed by directing each of the separated, conditioned polarization components along a respective optical path based on the conditioned polarization of the component and recombining the components to form an output beam. Polarization conditioning and other details of the switching and attenuation process are described below in conjunction with FIGS. 2B, 2C. One of skill in the art will appreciate that while the embodiment of optical device 200 as described herein is a 1×2 optical switch, optical device 200 is bi-directional in nature and may also operate equally effectively as a 2×1 optical switch. When optical device 200 operates as a 2×1 optical switch, input port 131 acts as the output port and output ports 132, 133 act as the input ports.

Figure 2B:
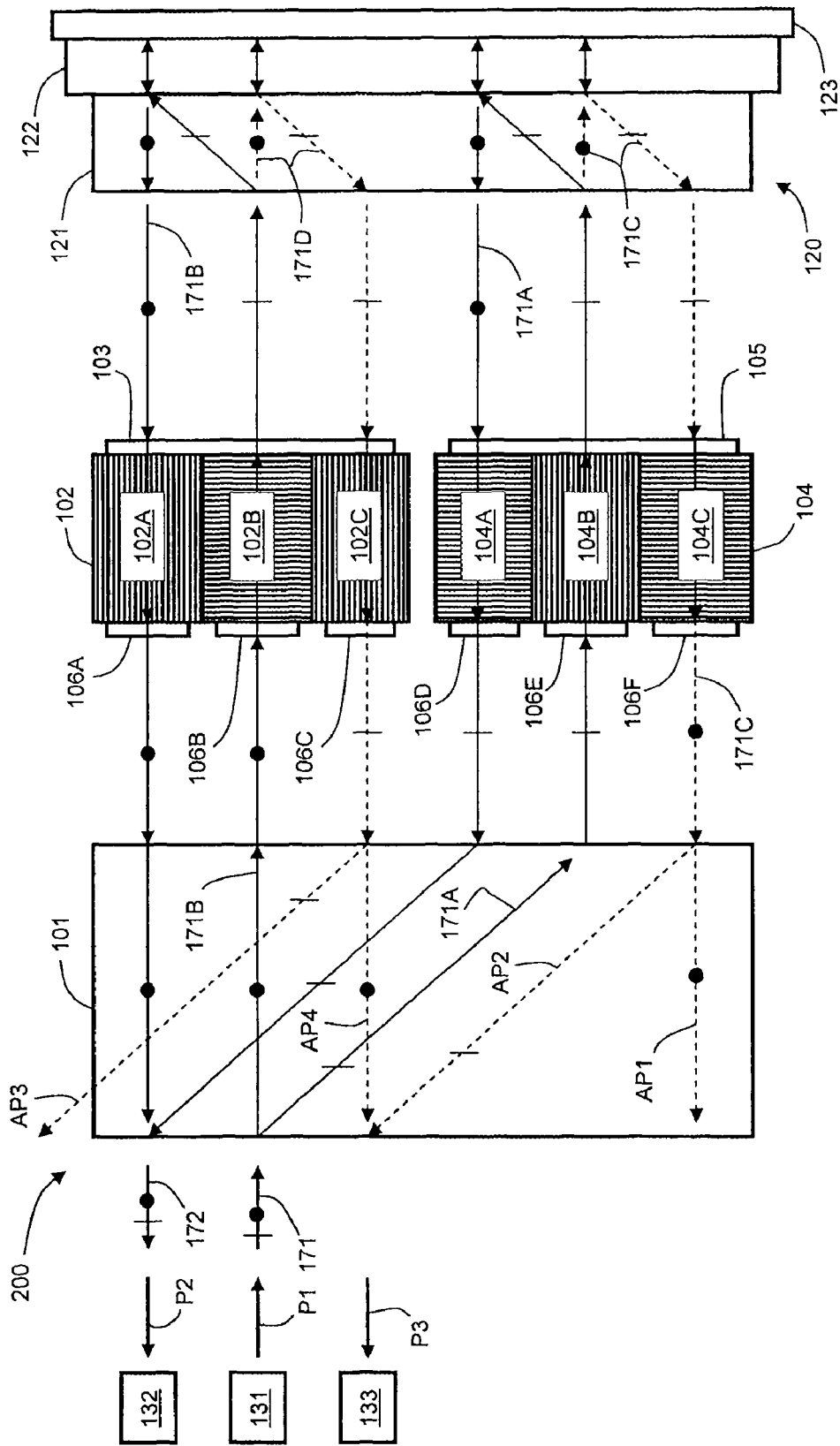
FIGS. 2B, 2C illustrate the optical paths taken by the s- and p-components of an input beam when an optical device is configured to switch the input beam to an output port, according to an embodiment of the invention.

FIG. 2B illustrates the optical paths taken by the s- and p-components of input beam 171 when optical device 200 is configured to switch input beam 171 to output port 132, according to an embodiment of the invention. Input beam 171 is directed from input port 131 to birefringent displacer 101 via optical path P1. Birefringent displacer 101 splits input beam 171 into two components 171A and 171B, where component 171A is the p-polarized component of input beam 171 and component 171B is the s-polarized component of input beam 171.

The path of component 171A through optical device 200 is described first. Component 171A is deflected downward as shown, exiting birefringent displacer 101 and then passing through subpixel 104B. Subpixel 104B conditions the polarization of component 171A as desired so that component 171A is subsequently directed to output port 132. In this embodiment, subpixel 104B is configured to rotate the polarization of component 171A by 0° (denoted by lines in subpixel 104B parallel to component 171A). Therefore, component 171A remains substantially p-polarized after leaving subpixel 104B. To that end, a potential difference of at least about 5V is applied between the electrodes for subpixel 104B, i.e., horizontal electrode 106E and vertical electrode 105. Such a potential difference across the LC material of subpixel 104B ensures that the extinction ratio of subpixel 104B is less than about −40 dB, that is, the intensity of s-polarized light in component 171A after passing through subpixel 104B is approximately four orders of magnitude greater than the intensity of p-polarized light in component 171A. Component 171A enters birefringent element 121 and is deflected upward, enters quarter-wave plate 122, reflects off of mirror 123, passes back through quarter-wave plate 122 and birefringent element 121, and thus is directed to subpixel 104A. By passing through quarter-wave plate 122 twice, the polarization of component 171A is rotated by 90°, therefore component 171A is converted to s-polarization and passes directly through birefringent element 121 without being deflected. After exiting polarization separating and rotating assembly 120, component 171A enters subpixel 104A. In this embodiment, subpixel 104A is configured to rotate the polarization of component 171A by 90° (denoted by lines in subpixel 104A perpendicular to component 171A). Therefore, component 171A is converted to substantially p-polarized light after leaving subpixel 104A. To that end, a potential difference of approximately zero volts is applied between the electrodes for subpixel 104A, i.e., horizontal electrode 106D and vertical control electrode 105. Component 171A is deflected upward by birefringent displacer 101, combining component 171A with component 171B as shown to form output beam 172, which is directed along optical path P2.

In a similar fashion, component 171B, which is the s-polarized component of input beam 171, is directed through subpixels 102B and 102A to optical path P2 to be recombined with component 171A and directed to output port 132. Subpixels 102A-C are not configured to rotate the polarization of component 171B in the same fashion that subpixels 104A-C rotate the polarization of component 171A. Consequently, the voltages applied between horizontal electrodes 106A-C and vertical electrode 103 are not the same as the voltages applied between horizontal electrodes 106D-F and vertical electrode 105. To with, in the configuration of optical device 200 illustrated in FIG. 2B, a potential difference of at least about 5V is applied between the electrodes for subpixels 102A and 102C, and a potential difference of approximately zero volts is applied between the electrodes for subpixel 102B.

It is known in the art that in certain voltage regimes LC-based optical switches have a sub-optimal extinction ratio, making adequate switch isolation problematic. For example, at zero volts, a twisted nematic LC material may have an extinction ratio of only −10 to −15 dB. Consequently, after passing through such an LC, light initially having a single polarization may exit the LC with a residual quantity of optical energy having the opposite polarization. If there is directivity between the LC and an inactive output port, the unwanted residual light may be inadvertently directed to the inactive output port, which is highly undesirable. Optical device 200 avoids such a scenario by directing unwanted optical energy through LC beam-polarizing structure 102 or 104 twice. In the second pass through the LC beam-polarizing structure, the polarization state of the residual beam is conditioned to a polarization state that can be subsequently filtered or redirected from an undesirable optical path.

FIG. 2B illustrates the optical paths of residual beams 171C, 171D, which are by-products of components 171A, 171B passing through subpixels 102B, 104B, respectively. Residual beams 171C, 171D are made up of the small quantity of s-polarized and p-polarized light present in components 171A, 171B, respectively, after passing through subpixels 104B, 102B, respectively. Optical device 200 prevents a significant quantity of residual beams 171C, 171D from entering the inactive output port P3, thereby providing high-extinction ratio switching. For example, residual beam 171C is separated from component 171A by birefringent element 121, is converted to p-polarized by passing through quarter-wave plate 122 and is directed to subpixel 104C. Subpixel 104C is configured to rotate the polarization of residual beam 171C by 90°, converting residual beam 171C to substantially s-polarized after leaving subpixel 104C. The majority of optical energy in residual beam 171C then is directed along attenuation path AP1 by birefringent displacer 101 and does not enter output port 133. In practice, a small portion of the optical energy in residual beam 171C, i.e., any p-polarized light, is directed to output port 133 by birefringent displacer 101 via attenuation path AP2. Because subpixel 104B, like subpixels 102A, and 102C, has an extinction ratio of less than −40 dB in the configuration illustrated in FIG. 2B, the intensity of unwanted optical energy reaching output port 133 via attenuation path AP2 is insignificant. Similarly, optical device 200 directs the optical energy of residual beam 171D to attenuation path AP3, rather than to output port 133. Only the s-polarized portion of residual beam 171D is directed to output port 133 along attenuation path AP4, but as with residual beam 171C, the s-polarized portion has been reduced by at least 40 dB and is insignificant.

Figure 2C:
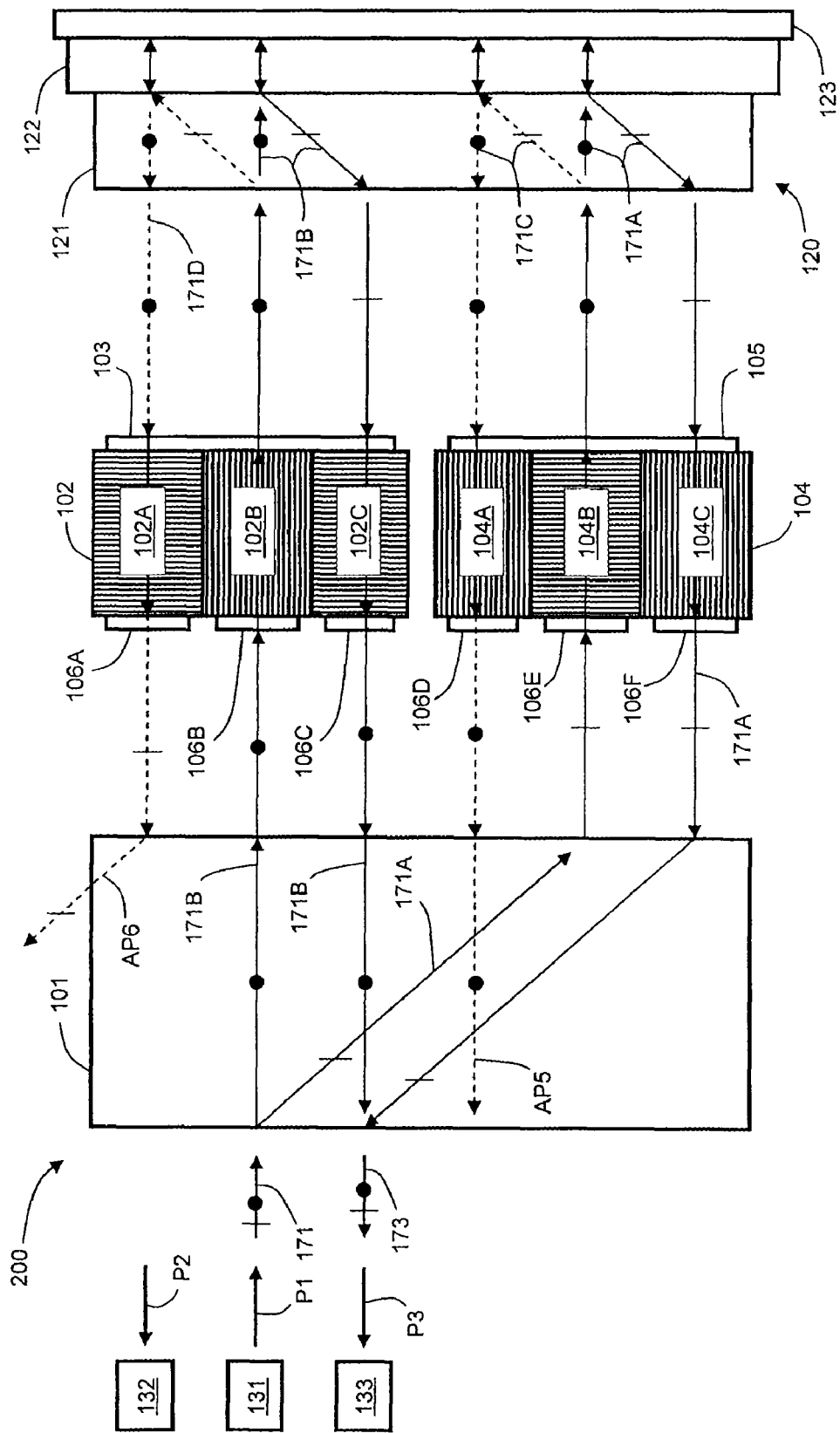

FIG. 2C illustrates the optical paths taken by the s- and p-components of input beam 171 when optical device 200 is configured to switch input beam 171 to output port 133, according to an embodiment of the invention. In this configuration, components 171A and 171B and residual beams 171C, 171D follow different optical paths since subpixels 102A-C and 104A-C have a different potential difference applied thereacross than in the configuration illustrated in FIG. 2B. When optical device 200 is configured to switch input beam 171 to output port 133, a potential difference of at least about 5 V is applied across subpixels 102B, 104A, and 104C so that polarized light passing therethrough does not change polarization. Conversely, a potential difference of about zero volts is applied across subpixels 102A, 102C, and 104B, so that the polarization of light passing therethrough is rotated by 90°. As shown, components 171A and 171B are combined into output beam 173 and directed to output port 133, and residual beams 171C, 171D are directed along attenuation paths AP5, AP6, respectively.

Optical device 200 also performs low PDL-attenuation of input beam 171, according to an embodiment of the invention. Attenuation of input beam 171 is accomplished by partially conditioning the polarization of input beam 171 with LC beam-polarizing structures 102 and 104, so that a portion of the optical energy of input beam 171 is directed to output port 132 and the remainder of the optical energy of input beam 171 forms residual beams that are directed along attenuation paths AP1 and AP3.

In such an embodiment, the potential difference applied across subpixels 102B and 104B is no longer maintained at either zero volts or 5 volts. Instead, the potential difference is varied between zero and 5 V so that subpixels 104B and 102B only partially condition the polarization of components 171A, 171B, respectively. In this way, the intensity of optical energy from input beam 171 that is ultimately directed to the desired output port, i.e., output port 132, may be reduced as desired. As a result, an increase in the intensity of optical energy portioned to residual beams 171C, 171D is increased accordingly. Thus, as input beam 171 is increasingly attenuated, residual beams 171C, 171D gain the attenuated optical energy. As described above, substantially all of the optical energy of residual beams 171C, 171D is directed along attenuation paths AP1, AP3, respectively, and does not enter the inactive output port, i.e., output port 133.

When attenuating input beam 171, each of components 171A, 171B may be attenuated substantially equally in order to minimize PDL. To attenuate each of components 171A, 171B substantially equally, the potential difference applied across subpixel 102B and the potential difference applied across subpixel 104B for a given attenuation level for input beam 171 are not the same. Instead, subpixels 102B and 104B are controlled independently so that the different electro-optic behavior of an LC material with respect to incident p-polarized light, i.e., component 171A, and s-polarized light, i.e., component 171B, can be compensated for to produce equal attenuation of each component.

Figure 1:
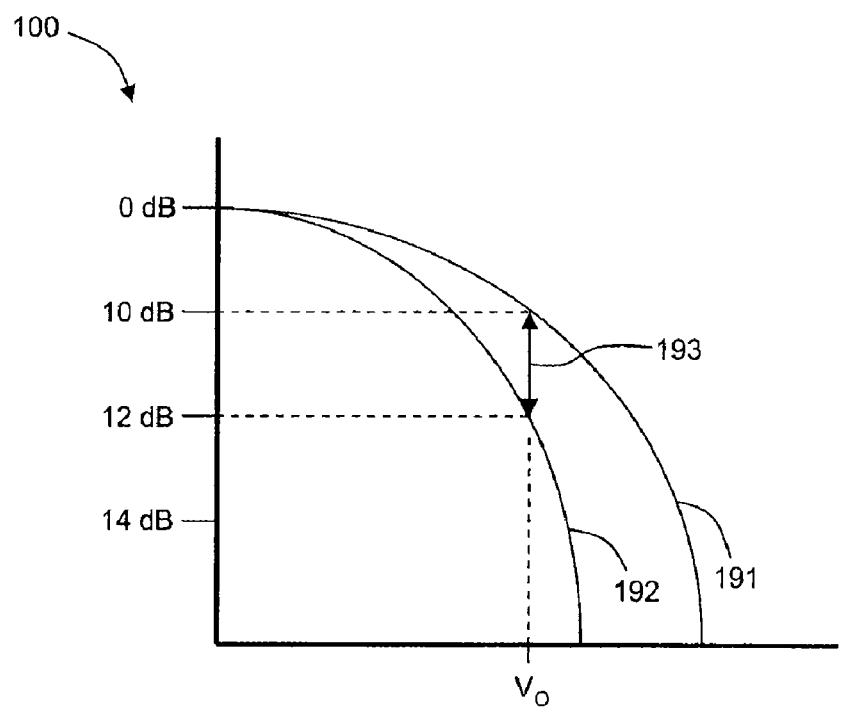
FIG. 1 illustrates the electro-optic behavior of a liquid crystal (LC) optical attenuator with respect to incident s- and p-polarized light.
Figure 3:
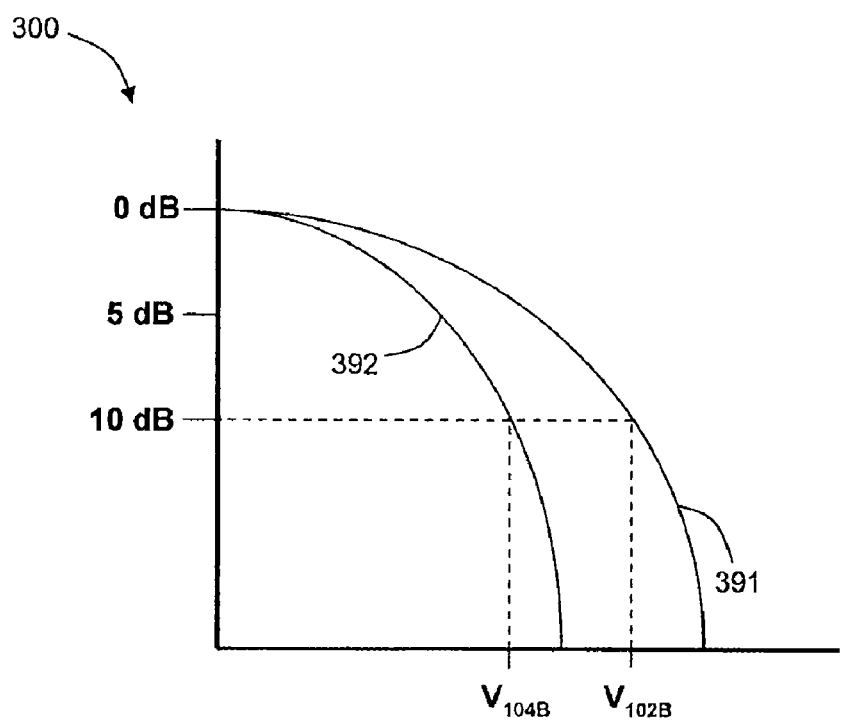
FIG. 3 is a graph illustrating how independent control of subpixels minimizes polarization dependent loss (PDL) when attenuating s- and p-components of an input beam, according to an embodiment of the invention.

FIG. 3 is a graph 300 illustrating how independent control of subpixels 102B and 104B minimizes PDL when attenuating components 171A, 171B, according to an embodiment of the invention. Graph 300 depicts the electro-optic behavior of subpixels 102B and 104B with respect to incident s- and p-polarized light. The abscissa of graph 300 represents the potential difference applied to subpixels 102B and 104B and the ordinate of graph 300 represents the resultant attenuation of a light beam normally incident on and passing through subpixels 102B and 104B. Attenuation curve 391 illustrates the attenuation of s-polarized light passing through either subpixel and attenuation curve 392 illustrates the attenuation of p-polarized light passing through either subpixel. As shown, at a given applied potential difference, the attenuation of p-polarized light differs substantially from the attenuation of s-polarized light. Because subpixels 102B and 104B are independently controlled, a different potential difference can be applied across each, thereby producing an equal attenuation level for s-polarized light passing through one subpixel and p-polarized light passing through the other subpixel. For example, when the desired attenuation level for input beam 171 is 10 dB, a potential difference $V_{102B}$ is applied to subpixel 102B and a potential difference $V_{104B}$ is applied to subpixel 104B. Component 171A, which is p-polarized and passes through subpixel 104B, is attenuated 10 dB when a potential difference of $V_{104B}$ is applied to subpixel 104B, as shown by attenuation curve 392. Similarly, component 171B, which is s-polarized and passes through subpixel 102B, is attenuated 10 dB when a potential difference $V_{102B}$ is applied to subpixel 102B, as shown by attenuation curve 391. Thus, the independent control of subpixels 102B and 104B enables low-PDL attenuation of input beam 171. In addition, the independent control of subpixels 102B and 104B enables optical device 200 to compensate for PDL suffered by input beam 171 from other sources, such as when input beam 171 is a light beam that has been spatially demultiplexed from a WDM signal by a diffraction grating.

Table 1 summarizes one electrode-biasing scheme for LC beam-polarizing structures 102, 104, by which input beam 171 may be switched between output ports 132, 133, and/or be attenuated as desired, according to embodiments of the invention. The 1×2 switching and attenuation of component 171B described above is accomplished by varying a control signal for LC beam-polarizing structure 102. Similarly, the 1×2 switching and attenuation of component 171A is accomplished by varying a control signal for LC beam-polarizing structure 104. For clarity, the biasing scheme of Table 1 is described with respect to LC beam-polarizing structure 102, but is equally applicable to LC beam-polarizing structure 104.

In accordance with this biasing scheme, a first bias is applied to horizontal electrodes 106A and 106C, a second bias of opposite polarity is applied to horizontal electrode 106B, and a third bias is applied to vertical control electrode 103, where the third bias is the control signal. The control signal may range in value between the first and second biases for horizontal electrodes 106A-C. The potential difference developed between a horizontal electrode and vertical control electrode 103 determines the manner in which each LC pixel conditions an incident beam of linearly polarized light. Thus, the potential difference developed between vertical control electrode 103 and horizontal electrode 106A determines the polarizing effect of the LC subpixel 102A in LC beam-polarizing structure 102. For an LC pixel containing a twisted nematic (TN) mode LC material, a potential difference thereacross of up to about 1.2 V converts the majority of linearly polarized light from s- to p-polarized and vice versa. An LC pixel having a potential difference thereacross of more than about 4.0 V converts essentially none of the polarization of an incident beam. Consequently, an LC pixel having a potential difference thereacross of between about 1.2 V to 4.0 V partially converts the polarization of incident light as a function of the potential difference.

Table 1 presents the resultant potential difference (in volts) produced across each of subpixels 102A-C through which component 171B and residual beam 171D pass. The value of the resultant potential difference across each LC pixel is determined by cross-indexing the bias, in volts, applied to vertical control electrode 103 (given in Row 1 of Table 1) with the bias, in volts, applied to horizontal electrodes 106A-C (given in Column 1 of Table 1). In the example summarized by Table 1, a constant bias of +6 V is applied to subpixels 102A and 102C via horizontal electrodes 106A and 106C, respectively. A constant bias of −6 V is applied to subpixel 102B by horizontal electrode 106B. The bias applied to vertical control electrode 103 may be varied between +6 V and −6 V.

TABLE 1

Resultant Potential Difference (in V) Across Subpixels of LC Beam-Polarizing Structure 102

| Bias on Vertical Electrode → 103 (or 105) | +6 | +3 | 0 | −3 | −6 |
|---|---|---|---|---|---|
| Bias on 106A and 106C (or on 106D and 106F) | −6 | −12 | −9 | −6 | −3 | 0 |
| Bias on 106B (or 106E) | +6 | 0 | 3 | 6 | 9 | 12 |
| Output Port Status | 133 | BLOCKING | | ATTENUATING | |
| | 132 | ATTENUATING | | BLOCKING | |

Referring to Table 1, the resultant potential difference that may be produced across each LC pixel of LC beam-polarizing structure 102 ranges from −12 V to +12 V. Therefore, subpixels 102A-C may be set to fully or partially convert the polarization of component 171B, or to allow component 171B to pass through unconverted. As summarized in Rows 4 and 5 of Table 1, by varying the bias applied to vertical control electrode 103, component 171B may be fully or partially directed to optical output port 132, output port 133, or blocked, i.e., directed along an attenuation path. Similarly, the biasing scheme presenting in Table 1 may be applied to LC beam-polarizing structure 104 to fully or partially direct component 171A to optical output port 132, output port 133, or along an attenuation path.

One of skill in the art will appreciate that the specific values disclosed in Table 1 for the biasing scheme for vertical control electrodes 103, 105 and horizontal electrodes 106A-F may be altered in embodiments of the invention. For example, because the behavior of LCs is a function of the potential difference between vertical control electrodes 103, 105 and horizontal electrodes 106A-F, it is contemplated that the bias on all electrodes may be increased or decreased the same amount without affecting the behavior of subpixels 102A-C and subpixels 104A-C. Further, the range of potential difference between said electrodes need not be held to exactly −12 V to +12 V. Depending on what LC material is present in subpixels 102A-C and 104A-C, the potential differences disclosed in Table 1 may be altered in order to optimize the optical performance of said LC materials.

Figure 4B:
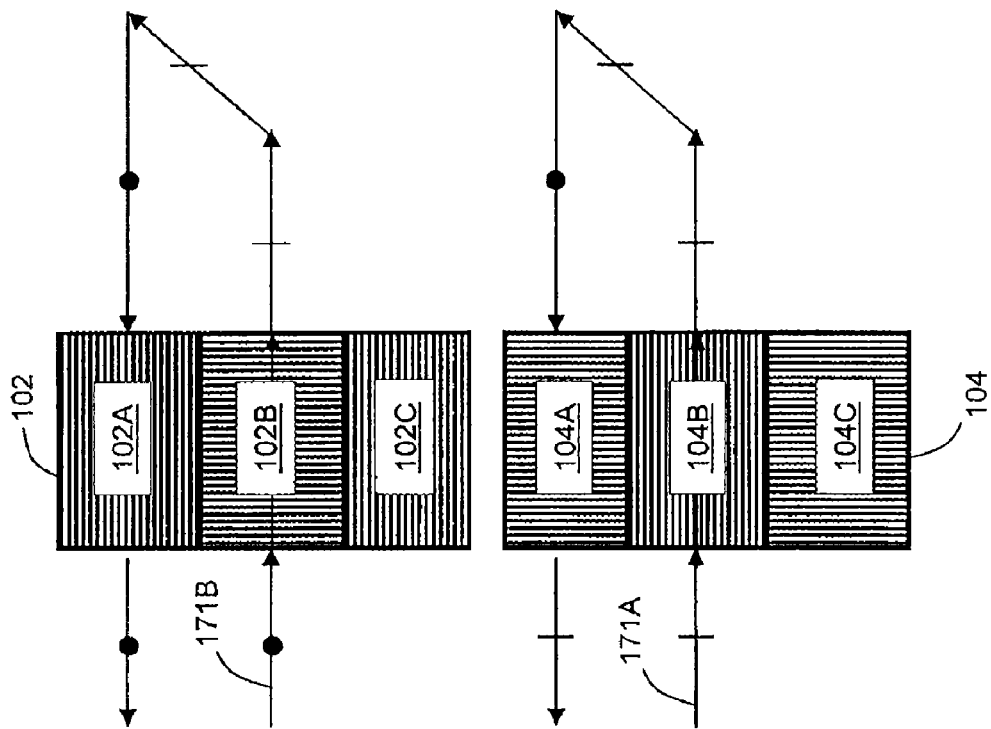
FIGS. 4A, 4B illustrate schematic side views of an LC beam-polarizing structure when configured to switch an input beam to an output port, according to an embodiment of the invention.
Figure 4A:
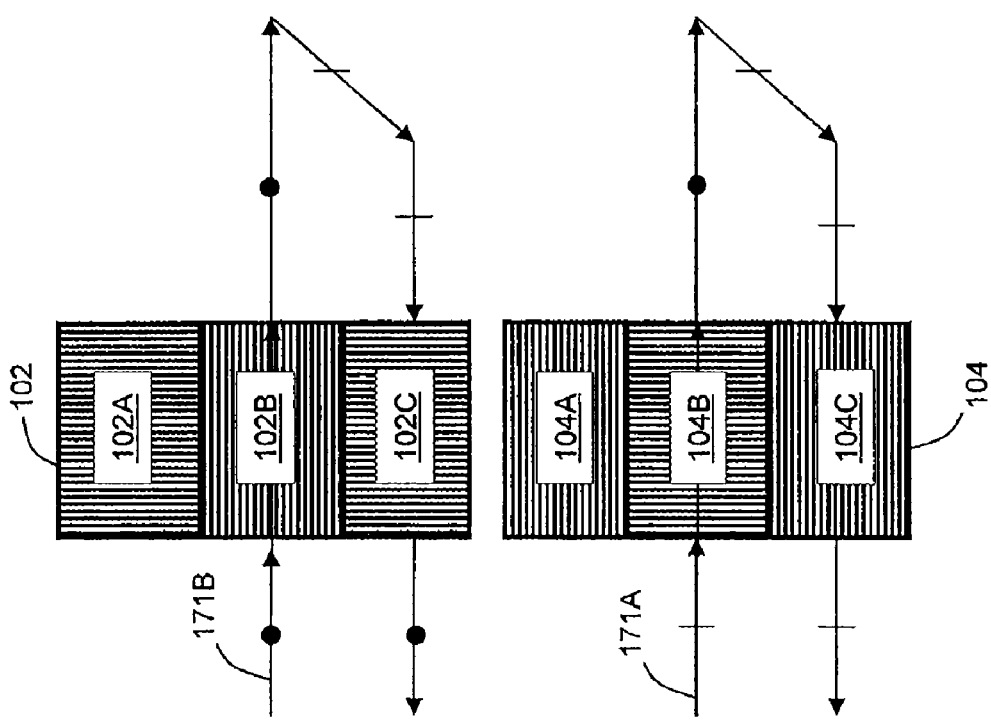

FIG. 4A illustrates a schematic side view of LC beam-polarizing structures 102 and 104 when configured to switch input beam 171 to output port 133. Subpixels 102B and 104C have a potential difference of 12 volts applied thereacross and allow incident light to pass through with substantially no change in polarization state, while subpixels 102C and 104B have a potential difference of zero volts applied thereacross and rotate the polarization state of incident light 401 by 90°. FIG. 4B illustrates a schematic side view of LC beam-polarizing structures 102 and 104 when configured to switch input beam 171 to output port 132, with the conditioning state of each of subpixels 102A-C and 104A-C illustrated accordingly.

In sum, the bias value of vertical control electrode 103 determines the portion of component 171B that is attenuated, i.e., conditioned to an opposite polarization state than is desired to enter an output port, and subsequently directed to an attenuation path. In this way, 1×2 switching and attenuation of component 171B is controlled by a first control signal and is performed by a single (i.e., an uncascaded) LC structure. The bias value of vertical control electrode 105 determines the portion of component 171A that is attenuated, therefore 1×2 switching and attenuation of component 171A is controlled by a second control signal and is performed by a single LC structure. Such an arrangement reduces the size and complexity of an optical system performing the switching and attenuation functions, particularly when LC beam-polarizing structures 102 and 104 are fabricated as a single LC structure. In addition, control of such a system is simplified, since only two control signals are required for switching and attenuation of an input beam—a first control signal for switching and attenuation of the s-component of the input beam and a second control signal for switching and attenuation of the p-component of the input beam.

Figure 5:
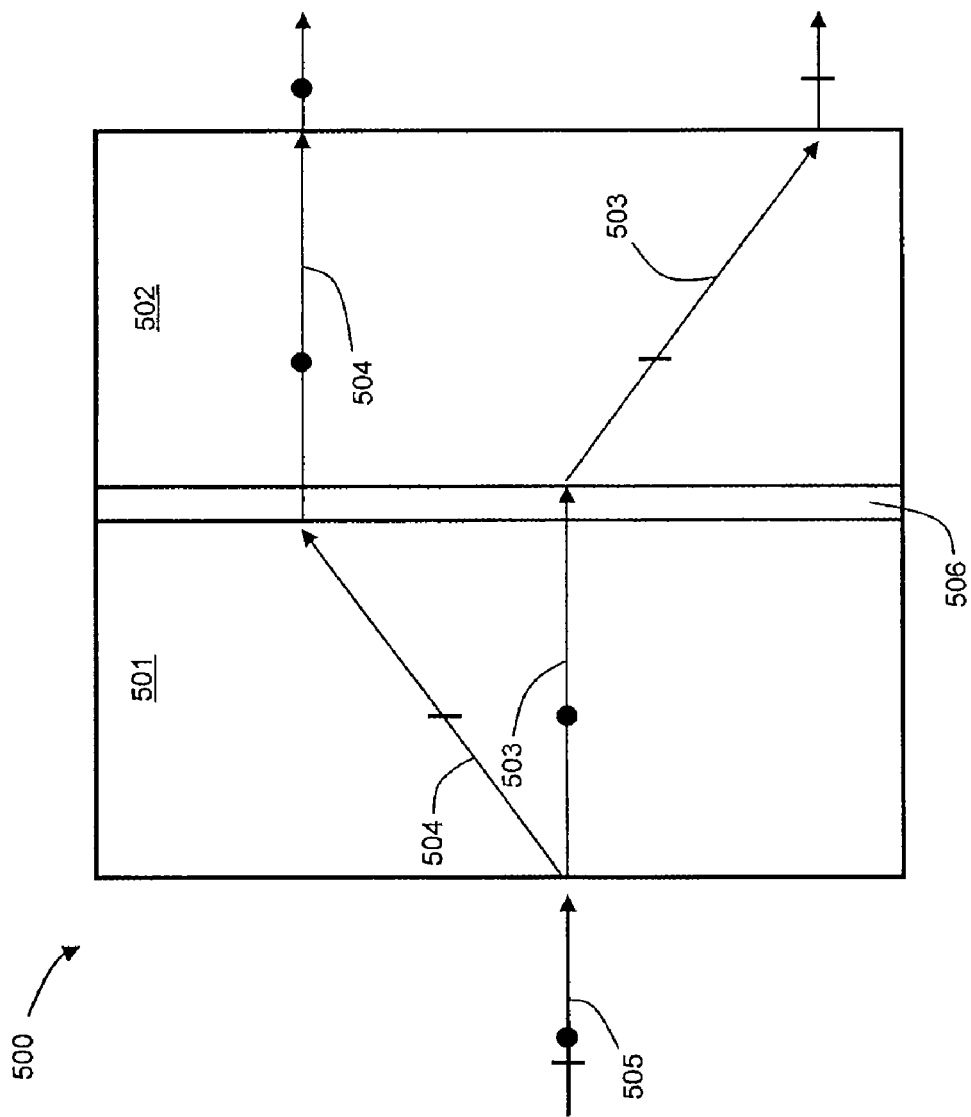
FIG. 5 illustrates a schematic side view of a birefringent assembly.

Referring back to FIGS. 2B, 2C, the optical path lengths of components 171A and 171B through birefringent displacer 101 are substantially different, which may produce significant polarization mode dispersion (PMD) and other issues. One of skill in the art will recognize that birefringent displacer 101 in optical device 200 may be replaced with a birefringent assembly that provides equal path lengths for components 171A and 171B. FIG. 5 illustrates a schematic side view of one example of such an assembly. Birefringent assembly 500 includes a first birefringent crystal 501 and a second birefringent crystal 502 that, when configured as shown, provide equal optical path lengths for s-polarized component 503 and p-polarized component 504 of an input beam 505. In one embodiment, a half-wave plate 506 may be installed between first birefringent crystal 501 and second birefringent crystal 502 to provide a preferred arrangement for s-polarized component 503 and p-polarized component 504.

Figure 6:
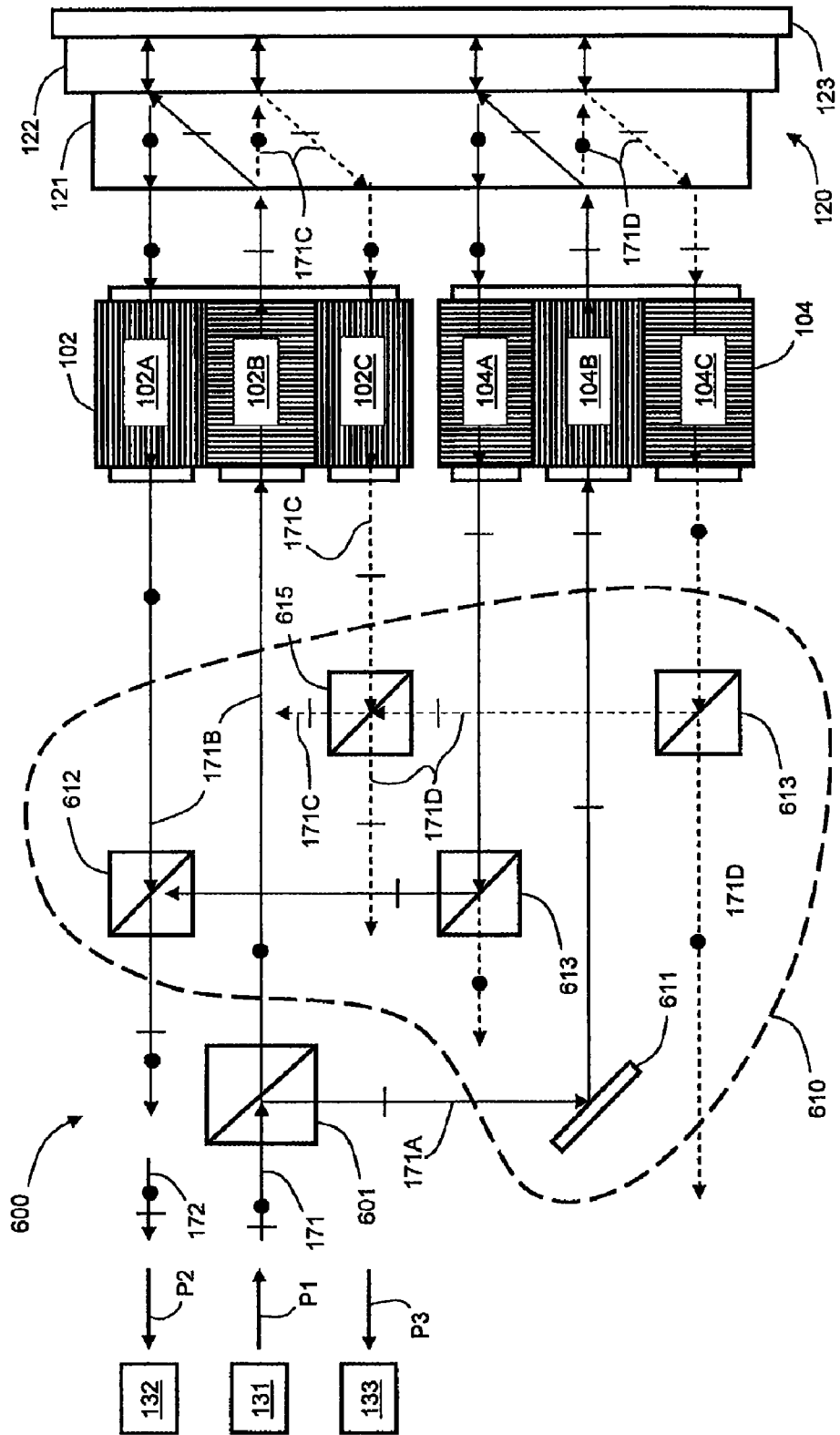
FIG. 6 illustrates a schematic side view of an optical device configured with multiple polarization beam splitters, according to an embodiment of the invention.

In one embodiment, a polarization beam splitter is used as birefringent displacer 101 to separate an input beam into s- and p-polarized components, instead of a YVO$_4$ crystal. Additional polarization beam splitters may also be used to direct an output beam of one polarization to an output port and unwanted optical energy of another polarization to a loss port, light dump, or other means of elimination. FIG. 6 illustrates a schematic side view of an optical device 600 configured with multiple polarization beam splitters, according to an embodiment of the invention.

Optical device 600 is substantially similar to optical device 200, except that a polarization beam splitter 601 and an optical array 610 are used in lieu of a YVO$_4$ crystal. Polarization beam splitter 601 separates input 171 beam into s- and p-polarized components and optical array 610 selectively directs said components to LC beam-polarizing structures 102 and 104 and to output ports 132, 133. Optical array 610 includes a mirror 611, a combining optic 612, and polarization beam splitters 613, 614, and 615. By way of illustration, the optical paths depicted in FIG. 6 are for components 171A and 171B when optical device 600 is configured to switch input beam 171 to output port 132. Polarization beam splitter 613, 614, and 615 are configured to direct output beams to the active output port, e.g. output port 132, and residual beams away from the inactive output port e.g. output port 133. As with optical device 200 in FIGS. 2B, 2C, only residual beams that have been reduced by at least 40 dB are directed to the inactive output port.

FIG. 7A is a schematic top view of a WSS 700 that performs 1×2 switching and attenuation of a WDM signal, according to an embodiment of the invention. FIG. 7B is a schematic side view of WSS 700. WSS 700 can selectively direct each of the wavelength channels of an input light beam to one of two output optical paths. For example, an input light beam containing a plurality of wavelength channels enters through an input fiber and each of the individual wavelength channels may be directed to one of two output fibers. Embodiments of the invention contemplate the incorporation of an optical device substantially similar to optical device 200 into WSS 700. The LC-based optical switching device provides selective 1×2 switching and attenuation of the wavelength channels contained in a WDM signal. The terms "top view" and "side view" and references to the horizontal and vertical directions are for purposes of description only. One of skill in the art will recognize that WSS 700 may be configured in any orientation and perform 1×2 switching and attenuation as described herein.

WSS 700 includes an optical input port 701, optical output ports 702 and 703, beam shaping optics, a diffraction grating 710 and an optical switching assembly 720. WSS 700 may also include additional optics, such as mirrors, focusing lenses, and other steering optics, which have been omitted from FIGS. 7A, 7B for clarity. The beam shaping optics include x-cylindrical lenses 704, 705 and y-cylindrical lenses 706, 707. The components of WSS 700 are mounted on a planar surface 790 that is herein defined as the horizontal plane for purposes of description. In the example described herein, planar surface 790 is substantially parallel to the plane traveled by light beams interacting with WSS 700. Also for purposes of description, the configuration of WSS 700 described herein performs wavelength separation of a WDM signal in the horizontal plane and switching selection, i.e., channel routing, in the vertical plane.

Optical input port 701 optically directs a WDM optical input signal 771 to the WSS 700. Optical input signal 771 includes a plurality of multiplexed wavelength channels and has an arbitrary combination of s- and p-polarization. X-cylindrical lens 704 vertically extends inbound beam 750, and cylindrical lens 716 horizontally extends inbound beam 750. Together, X-cylindrical lens 704 and Y-cylindrical lens 706 shape optical input signal 771 so that the beam is elliptical in cross-section when incident on diffraction grating 710, wherein the major axis of the ellipse is parallel with the horizontal plane. In addition, X-cylindrical lens 704 and Y-cylindrical lens 706 focus optical input signal 771 on diffraction grating 710.

Diffraction grating 710 is a vertically aligned diffraction grating configured to spatially separate, or demultiplex, each wavelength channel of optical input signal 771 by directing each wavelength along a unique optical path. In so doing, diffraction grating 710 forms a plurality of inbound beams, wherein the number of inbound beams corresponds to the number of optical wavelength channels contained in optical input signal 771. In FIG. 7A, diffraction grating 710 is depicted separating optical input signal 771 into three input signals 771A-C. In practice, the number of optical channels contained in input signal 771 may be up to 50 or more. Because the separation of wavelength channels by diffraction grating 710 takes place horizontally in the configuration shown in FIGS. 7A, 7B, spectral resolution is enhanced by widening inbound beam 750 in the horizontal plane, as performed by Y-cylindrical lens 706. Diffraction grating 710 also performs wavelength channel combination, referred to as multiplexing, of output beams 772, 773.

Together, X-cylindrical lens 705 and Y-cylindrical lens 707 collimate optical input signal 771 so that the beam is normally incident to the first element of optical switching assembly 720, i.e., birefringent displacer 101. In addition, X-cylindrical lens 705 and Y-cylindrical lens 707 focus output beams 772, 773 on diffraction grating 710 after the beams exit optical switching assembly 720.

Optical switching assembly 720 is similar in organization and operation to optical device 200 in FIGS. 2A-C, except modified to condition the plurality of horizontally displaced wavelength channels de-multiplexed from optical input signal 771. To that end, optical switching assembly 720 includes an LC beam-polarizing array of structures similar to optical device 200.

Figure 7:
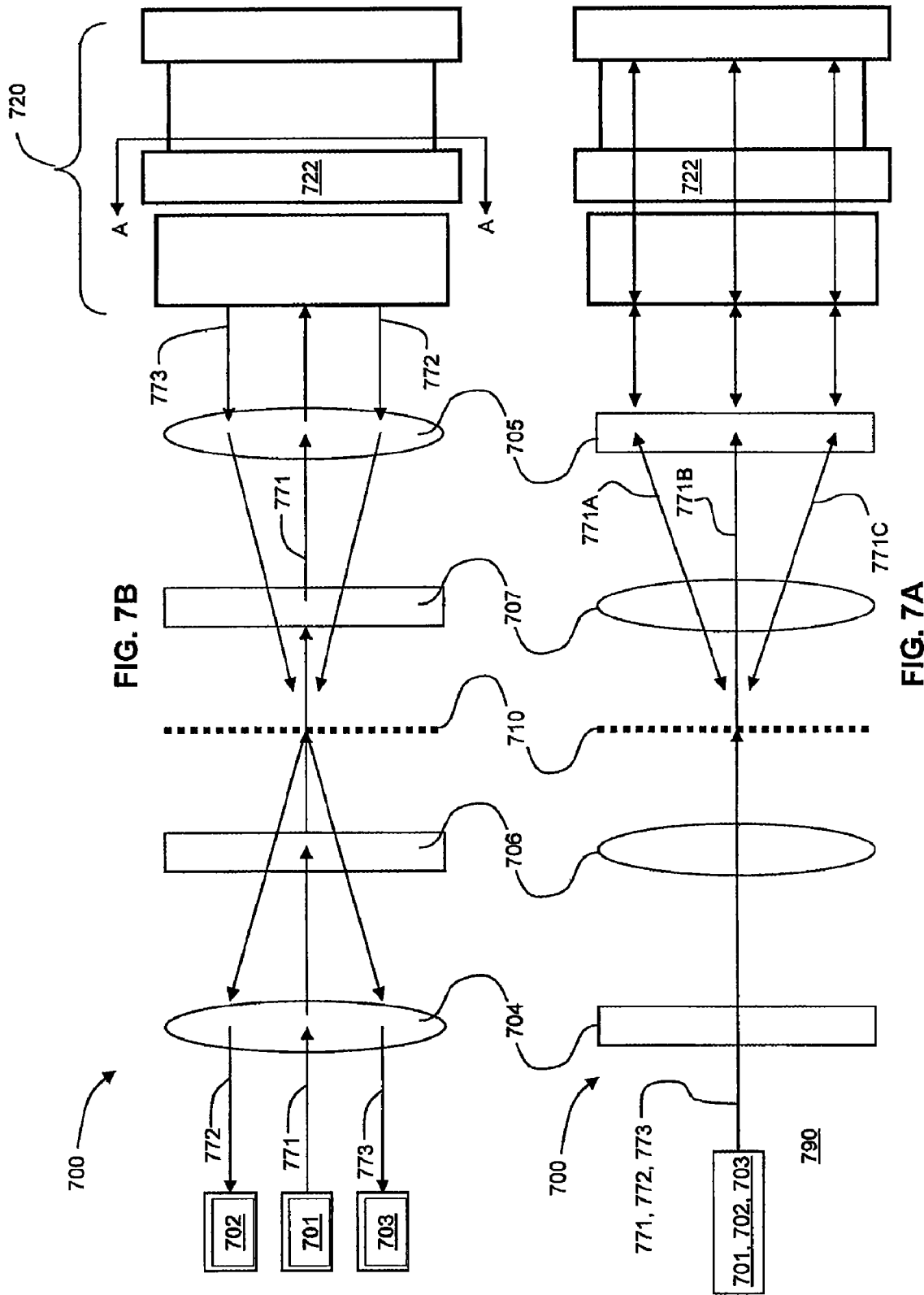
FIG. 7A is a schematic top view of a wavelength selective switch that performs 1×2 switching and attenuation of a WDM signal, according to an embodiment of the invention.
FIG. 7B is a schematic side view of a wavelength selective switch that performs 1×2 switching and attenuation of a WDM signal, according to an embodiment of the invention.
Figure 8:
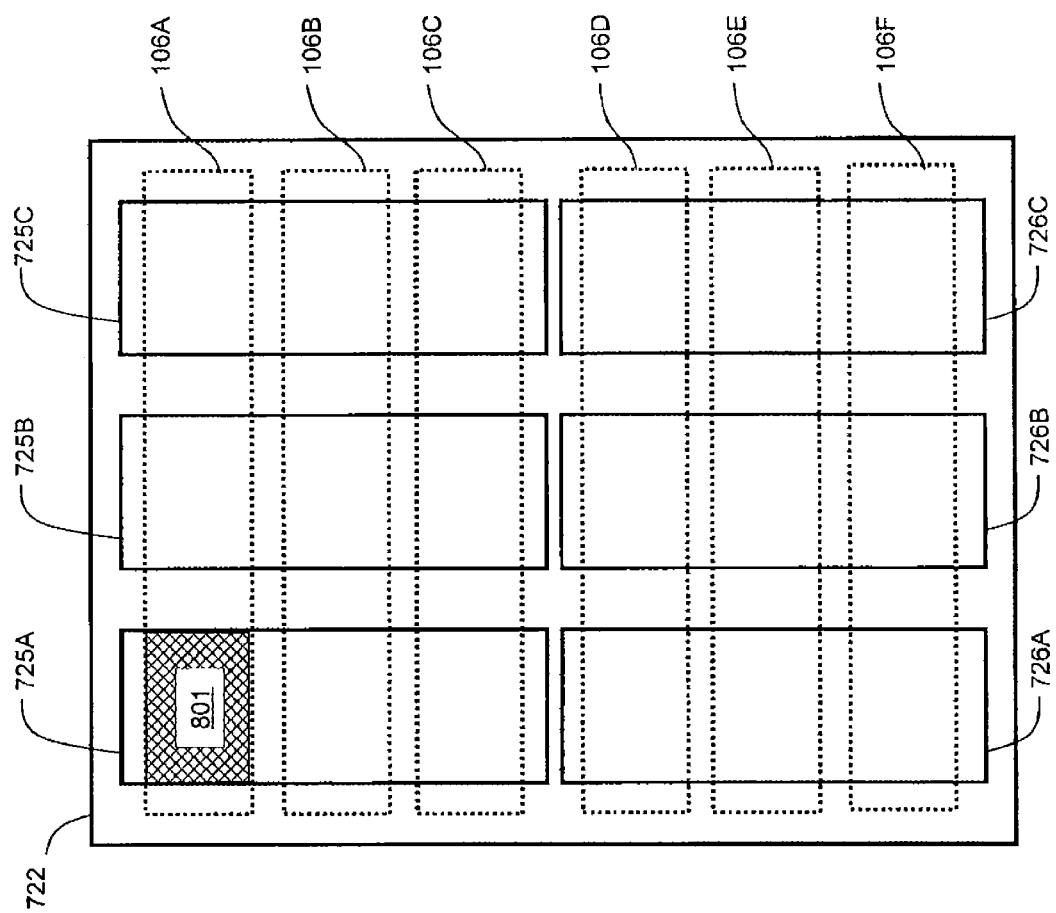
FIG. 8 illustrates a schematic cross-sectional view of an LC beam-polarizing array for processing multiple input light beams, according to an embodiment of the invention.

FIG. 8 illustrates a schematic cross-sectional view of an LC beam-polarizing array 722 for processing multiple input light beams, according to an embodiment of the invention. FIG. 8 is taken at section line A-A of LC beam-polarizing array 722, as indicated in FIG. 7. LC beam-polarizing array 722 includes a plurality of vertical control electrodes 725A-C and 726A-C and a plurality of horizontal electrodes 106A-F. Each of vertical control electrodes 725A-C is substantially similar in configuration to vertical control electrode 103 in FIGS. 2A-C, and corresponds to one of the wavelength channels into which optical input signal 771 is de-multiplexed. Similarly, each of vertical control electrodes, 726A-C is substantially similar in configuration to vertical control electrode 105 in FIGS. 2A-C and also corresponds to one of the wavelength channels demultiplexed from optical input signal 771. To that end, each of vertical control electrodes 725A-C, 726A-C is positioned appropriately so that the desired wavelength channel is incident on the requisite vertical electrode. For clarity, vertical electrodes for only three channels are illustrated in FIG. 8. Vertical electrode arrays configured for 50 or more wavelength channels are also contemplated. Horizontal electrodes 106A-F act as common electrodes for all wavelength channels processed by LC beam-polarizing array 722. The subpixels of LC beam-polarizing array 722 are defined by the regions between vertical control electrodes 725A-C, 726A-C and horizontal electrodes 106A-F. The cross-hatched region in vertical electrode 725A indicates one such subpixel 801 of LC beam-polarizing array 722.

In operation, WSS 700 performs optical routing of a given wavelength channel by conditioning (via LC polarization) and vertically displacing the s- and p-components of the channel in the same manner described above for input beam 171 in optical device 200. Thus, output beam 772, which is vertically displaced below input beam 771 in LC beam-polarizing array 722, includes the wavelength channels selected for output port 702. Similarly, output beam 773, which is vertically displaced above input beam 771 in LC beam-polarizing array 722, includes the wavelength channels selected for output port 703. Attenuation may also be performed on each wavelength channel independently in the manner described above for input beam 171 in optical device 200.

In sum, WSS 700 is an optical switching device that is capable of performing both WDM signal routing and wavelength independent attenuation on an input beam having an arbitrary combination of s- and p-polarization. A single LC beam-polarizing structure performs independently controlled attenuation and switching of the s- and p-polarization components of each wavelength channel of the input beam, which avoids significant PDL. Because polarization walk-off is not required by the WSS at the input fiber, another significant source of polarization dependent loss is avoided. In addition, the individual channels contained in a WDM signal can be equalized by the same optical switching device that performs 1×2 switching of the wavelength channels, thereby simplifying the fabrication, alignment, and control of the optical switching device.

While the foregoing is directed to embodiments of the present invention, other and further embodiments of the invention may be devised without departing from the basic scope thereof, and the scope thereof is determined by the claims that follow.

We claim:

1. An optical device comprising:
a birefringent displacer disposed in an optical path of an input beam and optical paths of multiple output beams that are produced from components of the input beam;
a first liquid crystal (LC) structure for conditioning the polarization state of incident light and disposed in optical paths of p-polarized components of the input beam and the output beams, the first LC structure having a plurality of LC cells and a first control electrode that applies the same control signal to the LC cells of the first LC structure; and
a second LC structure for conditioning the polarization state of incident light and disposed in optical paths of s-polarized components of the input beam and the output beams, the second LC structure having a plurality of LC cells and a second control electrode that applies the same control signal to the LC cells of the second LC structure,
wherein the first LC structure and the second LC structure are independently controllable using the first control electrode and the second control electrode, respectively.

2. The optical device according to claim 1, further comprising a second birefringent displacer disposed in the optical paths of the components of the input beam after the components of the input beam have passed through the first and second LC structures, wherein the second birefringent displacer produces the multiple output beams from the components of the input beam.

3. The optical device according to claim 2, further comprising a reflective element disposed in the optical paths of the multiple output beams to redirect the multiple output beams back through the second birefringent displacer, the first and second LC structures, and the first birefringent displacer.

4. The optical device according to claim 3, further comprising a quarter-wave plate disposed between the second birefringent displacer and the reflective element.

5. The optical device according to claim 1, wherein:
the first LC structure includes a first LC cell through which a first output beam passes, a second LC cell through which a first input beam component passes, and a third LC cell through which a second output beam passes, and
the second LC structure includes a fourth LC cell through which a third output beam passes, a fifth LC cell through which a second input beam component passes, and a sixth LC cell through which a fourth output beam passes.

6. The optical device according to claim 5, wherein the first and third output beams are combined in the first birefringent displacer to form an output beam.

7. The optical device according to claim 5, wherein the second and fourth output beams are combined in the first birefringent displacer to form an output beam.

8. An optical device configured to reduce polarization dependent losses by independently controlling p-polarized light components and s-polarized light components, comprising:
a first liquid crystal (LC) structure for conditioning the polarization state of incident light and disposed in optical paths of p-polarized components of an input beam and output beams produced from the input beam, the first LC structure having a plurality of LC cells and a first control electrode that applies the same control signal to the LC cells of the first LC structure; and
a second LC structure for conditioning the polarization state of incident light and disposed in optical paths of s-polarized components of the input beam and the output beams, the second LC structure having a plurality of LC cells and a second control electrode that applies the same control signal to the LC cells of the second LC structure,
wherein the control signal applied by the first control electrode is different from the control signal applied by the second control electrode.

9. The optical device according to claim 8, further comprising:
a first birefringent displacer disposed in an optical path of the input beam and the optical paths of the s-polarized and p-polarized components of the output beams; and
a second birefringent displacer disposed in the optical paths of the s-polarized and p-polarized components of the input beam after the s-polarized and p-polarized components of the input beam have passed through the first and second LC structures, wherein the second birefringent displacer produces the output beams from the s-polarized and p-polarized components of the input beam.

10. The optical device according to claim 9, further comprising a reflective element disposed in the optical paths of the output beams to redirect the multiple output beams back through the second birefringent displacer, the first and second LC structures, and the first birefringent displacer.

11. The optical device according to claim 10, further comprising a quarter-wave plate disposed between the second birefringent displacer and the reflective element.

12. The optical device according to claim 8, wherein:
the first LC structure includes a first LC cell through which a first output beam passes, a second LC cell through which a first input beam component passes, and a third LC cell through which a second output beam passes, and
the second LC structure includes a fourth LC cell through which a third output beam passes, a fifth LC cell through which a second input beam component passes, and a sixth LC cell through which a fourth output beam passes.

13. The optical device according to claim 12, wherein the first and third output beams are combined to form an output beam.

14. The optical device according to claim 12, wherein the second and fourth output beams are combined to form an output beam.

15. A wavelength selective switch comprising:
a wavelength dispersive element for separating an input beam into its wavelength components;
a first liquid crystal (LC) structure for conditioning the polarization state of incident light and disposed in optical paths of p-polarized components of the wavelength components and output beams produced from the wavelength components, the first LC structure having a plurality of LC cells and a first control electrode that applies the same control signal to the LC cells of the first LC structure; and
a second LC structure for conditioning the polarization state of incident light and disposed in optical paths of s-polarized components of the wavelength components and the output beams, the second LC structure having a plurality of LC cells and a second control electrode that applies the same control signal to the LC cells of the second LC structure,
wherein the first LC structure and the second LC structure are independently controllable using the first control electrode and the second control electrode, respectively.

16. The wavelength selective switch according to claim 15, further comprising:
- a first birefringent displacer disposed in an optical path of the wavelength components and the optical paths of the s-polarized and p-polarized components of the output beams; and
- a second birefringent displacer disposed in the optical paths of the s-polarized and p-polarized components of the wavelength components after the s-polarized and p-polarized components of the wavelength components have passed through the first and second LC structures, wherein the second birefringent displacer produces the output beams from the s-polarized and p-polarized components of the wavelength components.

17. The wavelength selective switch according to claim 16, further comprising a reflective element disposed in the optical paths of the output beams to redirect the output beams back through the second birefringent displacer, the first and second LC structures, and the first birefringent displacer.

18. The wavelength selective switch according to claim 17, further comprising a quarter-wave plate disposed between the second birefringent displacer and the reflective element.

19. The wavelength selective switch according to claim 15, wherein the LC cells of the first LC structure are arranged in three rows, each row having multiple LC cells, and the LC cells of the second LC structure are arranged in three rows, each row having multiple LC cells.

20. The wavelength selective switch according to claim 19, wherein the first LC structure includes a separate bias electrode for each of the three rows of LC cells and the second LC structure includes a separate bias electrode for each of the three rows of LC cells.

* * * * *